June 29, 1937. O. H. BANKER Re. 20,426

AUTOMATIC CLUTCH

Original Filed Oct. 21, 1927 2 Sheets-Sheet 1

INVENTOR.
Oscar H. Banker
BY
Leander French
ATTORNEY.

June 29, 1937. O. H. BANKER Re. 20,426

AUTOMATIC CLUTCH

Original Filed Oct. 21, 1927 2 Sheets-Sheet 2

INVENTOR.
Oscar H Banker
BY
Lemley & Friend
ATTORNEYS

Reissued June 29, 1937

Re. 20,426

UNITED STATES PATENT OFFICE 20,426

AUTOMATIC CLUTCH

Oscar H. Banker, Chicago, Ill., assignor, by mesne assignments, to New Products Corporation, Chicago, Ill., a corporation of Delaware Original No. 1,795,464, dated March 10, 1931, Serial No. 227,828, October 21, 1927. Divided April 23, 1930, Serial No. 446,680. Patent No. 1,861,830, dated June 7, 1932. Application for reissue May 4, 1933, Serial No. 670,387

9 Claims. (Cl. 192—105)

The invention relates to clutches and more particularly to automatic clutches.

This application is a division of my co-pending application Serial No. 227,828, filed October 21, 1927, and has for its object to provide a novel construction and arrangement of speed-controlled clutch mechanism wherein the parts are held in clutched relation at a predetermined speed regardless of a further movement of the governor above this speed and in which the governor is effective to cause the release of said clutch only at a predetermined decrease in engine speed.

A further object of the invention is to provide a speed-controlled clutch mechanism associated with a manual control for preventing the operation of the speed-responsive means from shifting the clutch.

The invention further consists in the several features hereinafter set forth and more particularly defined by claims at the conclusion hereof.

In the drawings, Fig. 1 is a vertical sectional view of clutch mechanism embodying the invention;

Figure 1:
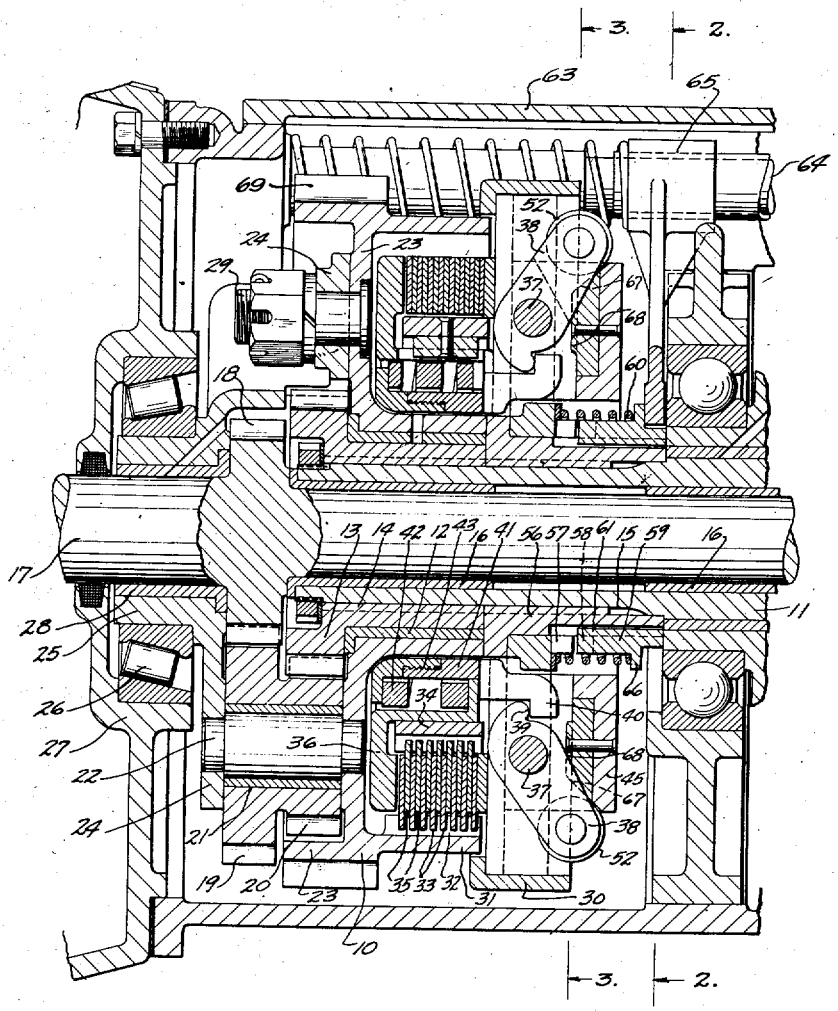
Figure 2:
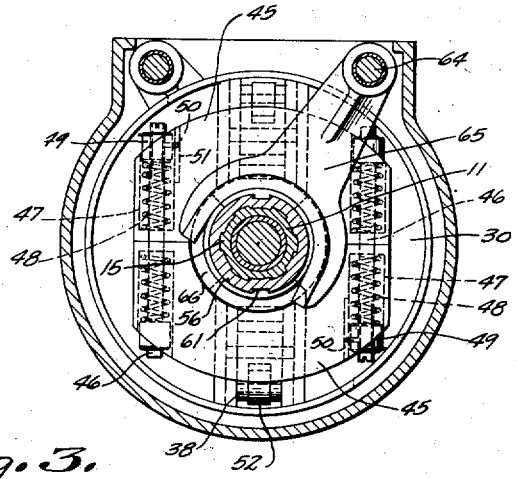
Fig. 2 is a detail sectional view taken on the line 2—2 of Fig. 1.
Figure 3:
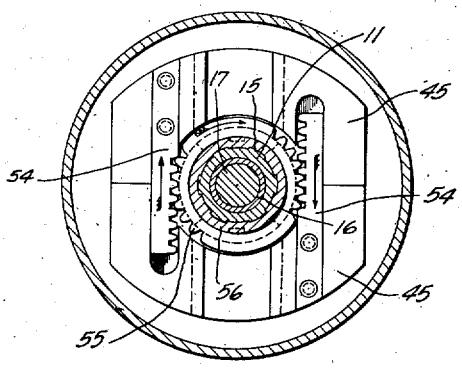
Fig. 3 is a detail sectional view taken on the line 3—3 of Fig. 1.
Figure 5:
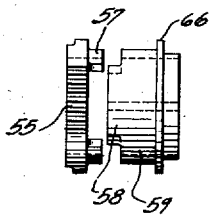
Fig. 5 is a view showing the governor-locking clutches.

Only so much of the structure of the original application, Serial No. 227,828 filed October 21, 1927, has been shown as is necessary to show and explain one of the automatic clutch mechanisms of that application and only so much of the structure shown in Fig. 1 will be described in detail as relates to this clutch mechanism, as the operation and features of the transmission mechanism itself have been fully shown and described in the aforementioned application.

Referring to the drawings, the numeral 10 designates a drive member and 11 a driven member in the form of a tubular shaft.

The drive member 10 as here shown is a planetary gear carrier whose hub has a bushing 12 journalled on the hub of the driven gear 13 of the change speed planetary gear unit, which is provided with keyed projections 14 fitting in splines 15 in the driven shaft 11 provided with bushings 16 in which the main drive shaft 17 of the transmission is journalled, said shaft having a drive gear 18 formed integral therewith or suitably secured thereto.

A series of planet gears are mounted on the planet carrier 10, one set of these gears 19 and 20 being shown, said gears being formed as a unit having a bushed bearing 21 journalled on a shaft or pin 22 which is mounted at one end in one part 23 of the carrier and in the other in the part 24 of said carrier, whose hub 25 is journalled in a roller bearing 26 mounted in the front end plate 27 of the transmission casing and whose bearing 28 forms a bearing for the shaft 17, the parts 24 and 23 being secured together by a series of bolts 29, one being shown.

The spline 15 also serves to connect with the driven shaft 11 the governor disk 30. The drive member 10, instanced here as the planetary carrier, is provided with an outer flange 31 provided on its inner periphery with clutch keys 32 which cooperate with the driving disks or clutch plates 33 in the usual and well-known manner.

The governor disk 30 is provided with a laterally extending ring 34 which is keyed to the driven disks or clutch plates 35 which are interposed between and cooperate with the driving disks 33 to establish a driving connection between said disk 30 and the carrier 10 when the requisite pressure is applied to said disks.

The pack of driving and driven clutch plates is disposed between a pressure plate 36 and the back face of the governor disk 30, which at 37 has the levers 38 fulcrumed thereon. Each lever 38 has one end provided with a hook 39 which is adapted to engage with the hooked end 40 of a member 41 forming part of a tension-controlling device. This device includes a flat, coiled spring 42 which is encased in the separable members 41 and 43 and the pressure plate 36 by means of a threaded connection between the parts 41 and 43.

The governor disk 30 has a pair of governor blocks or weights 45 slidably mounted thereon through which pass the floating studs 46 and said blocks are recessed as at 47 to form pockets to receive springs 48 which encircle the floating studs 46. The lower end of each stud is provided with a nut 49, in threaded engagement with it, and provided with a pin 50 which is slidable in a keyway 51 on one of the governor weights 45. The nuts 49 are locked in their adjusted position in any suitable manner.

Figure 4:
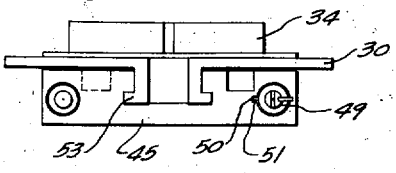
Fig. 4 is a plan view of the governor.

Each governor weight 45 is adapted to travel in the path of a roller 52 mounted on the free end of the lever 38. The manner in which the governor weights are slidably keyed on the governor disk is best seen in Fig. 4, from which it will be seen that said disk is provided with the guides 53 on which the governor weights 45 are slidable.

Each governor weight has fixed to it a rack 54 which meshes with a pinion 55 which is loosely mounted on the hub 56 of the governor disk 30. The pinion 55 has on one face a clutch member 57 which cooperates with clutch faces 58 of a manually shiftable clutch member 59. A spring 60 interposed between shouldered portions of the clutch members 57 and 59 acts to normally separate the same. The clutch member 59 is slidably keyed at 61 on the hub 56 of the governor disk 30.

The housing 63 has a guide rod 64 mounted on it on which a manually operable shifter fork 65 is slidably mounted, the fork of which engages the flange 66 of the clutch member 59 for moving the same against the pressure of the spring 60 to engage the clutch members 57 and 58.

The governor weights 45 have inclined faces 67 and dwells 68 so that when a roller 52 reaches a dwell 68 the clutch is locked and the lever 38 is in dwell. As the governor weights 45 move outwardly under the influence of centrifugal force their inclined faces 67 engage the rollers 52 and swing the levers 38 in a clockwise direction and thus move the parts 41' and 36 to put pressure on the disks 33 and 35 to establish a driving relation between the shafts, which continues so long as the rollers 52 are on the dwells 68 so that any increase in governor speed to further expand the governor will not vary the positions of the levers 38.

As herein shown, the planetary gear carrier 10 is provided with a peripheral gear 69 which, as shown in detail in the aforementioned application, is adapted to cooperate with an automatic brake mechanism to prevent the tendency of the said carrier to rotate backwards under the action of the drive gear 18 on the planet gears and this brake remains in action until a predetermined speed of the driven shaft 11 has been reached, the drive then being from the shaft 17 through gears 18, 19, 20 and 13 to the driven shaft 11. As the speed of the driven shaft 11 increases the weights 45 tend to move outwardly under the action of centrifugal force and against the resistance of the springs 48 and when the desired predetermined speed is reached said weights 45 move radially outward, thus engaging the rollers 52 and swinging the arms of the levers 38 carrying these rollers outwardly and through their hooked connections 39, 40 with the member 41 exerting a pull on said member which is transmitted through the spring 42 to the pressure plate 36, which in turn moves against and puts pressure on the disks 33 and 35 and thus connects the governor disk 30 with the planetary carrier and since the governor disk 30 is keyed to the shaft 11 the carrier 10 starts to turn, but since at that time the speed of the driven shaft 11 is the same as that of the drive shaft 17 both shafts revolve as a unit with the planet gears 19 and 20 acting as keys between the gears 18 and 13, it beir understood that rotation of the carrier 10 in the same direction as the driven shaft causes an automatic release of the brake mechanism above referred to. With the parts in this driving relation the weights 45 are free to move further outwardly on a further increase in speed of the shaft 11 without affecting the clutch, since this clutch is now locked by the rollers 52 moving onto the dwells 68. Conversely when the governor weights 45 move inwardly the clutch above described is not declutched until the rollers 52 ride down the inclined faces 67. In other words, the clutch is not declutched until a predetermined decrease in engine speed has been effected, which it will be noted, is at a lower speed than that at which engagement is effected, since as a result of the dwells 68 and the levers 38, only the resistance of the springs 48 influence the return of the weights 45 to contracted position and hence of the clutch to declutched position. In this connection, when the weights 45 are in expanded position, the levers 38 under the action of the spring 42 are forcing said weights against their guides with increasing frictional resistance so that said spring 42 is thereby retarding the return of the weights and as a consequence the springs 48 cannot return the weights 45 to their collapsed position until a much lower speed of the unit is reached than that at which engagement is effected.

It will also be noted that the spring 42 provides a yielding drive for the clutch plates which reduces jars and shocks on the mechanism and makes for long life of the clutch parts.

When the governor weights 45 are in retracted position the clutch members 57 and 58 are in position to be meshed so that under these conditions if the operator wishes to prevent the governor from operating the clutch he operates the shifter lever 65 to move the clutch member 59 into mesh with the clutch member 57 and under these conditions, since the clutch member 59 is keyed to the governor hub 56 which in turn is keyed to the shaft 11, the pinion 55 is prevented from rotating and hence the racks 54 and the governor weights 45 can not move so that the governor is rendered inoperative.

Furthermore, with the particular construction herein shown, if the operator should attempt to move the clutch member 59 into mesh with the clutch member 57 when the governor weights are in expanded condition he cannot do this because under these conditions, the governor weights acting through the racks 54 have turned the pinion 55 and consequently the clutch face 57 to a position in which said clutch face is out of register with the clutch face 58 of the member 59.

It is also to be noted that the parts 41 and 43 form an actuator engaging the spring 42 to control the clutch.

I desire it to be understood that this invention is not to be limited to any particular form or arrangement of parts except insofar as such limitations are included in the claims.

What I claim as my invention is:

1. The combination of a driving and a driven shaft and a governor-controlled unit operatively connecting said shafts including a clutch, means for controlling said clutch including levers, and speed-responsive, governor weights having inclined faces and dwells cooperating with said levers.

2. The combination of a driving and a driven shaft, and a governor-controlled unit operatively connecting said shafts including a clutch, speed-responsive governor weights and levers operated by said weights, to automatically lock said clutch on a predetermined speed without further movement of said levers in their locking direction on an increase in speed above the predetermined speed and effective to cause the declutching of said clutch only at a predetermined decrease in speed.

3. The combination of a driving and a driven shaft, a governor-controlled unit operatively connecting said shafts including a clutch, an actuator for said clutch, a resilient cushion between said actuator and said clutch, levers cooperating with said actuator to control said clutch, rollers at the free ends of said levers, and speed-responsive, governor weights having inclined faces and dwells inwardly of such faces on which said rollers ride to control the movements of said levers.

4. The combination of a driving and a driven shaft, a governor controlled unit operatively connecting said shafts including a clutch, an actuator for said clutch, a resilient cushion between said actuator and said clutch, levers cooperating with said actuator to control said clutch, rollers at the free ends of said levers, and speed-responsive weights engaging said rollers.

5. The combination of a driving and a driven shaft, clutch mechanism operatively connecting said shafts, speed-responsive means for actuating said clutch including governor weights, a jaw clutch having a clutch member geared to said weights to be turned thereby, and a manually shiftable, co-operative clutch member cooperating with said geared clutch member to retain said weights in one of their positions.

6. The combination of a driving and a driven shaft, clutch mechanism operatively connecting said shafts, speed-responsive means for actuating said clutch including governor weights, racks carried by said weights, a pinion on one of said shafts meshing with said racks and provided with a clutch face, and a manually operable clutch member engageable with the clutch face of said pinion to lock said pinion and governor weights in retracted position to prevent operation of said clutch.

7. The combination of a driving and a driven shaft, a governor mounted on one of said shafts, a disk clutch between said governor and the other of said shafts, said governor including centrifugally operable members and multiplying levers operatively associated therewith and movable relative thereto, and a resilient, pressure-transmitting connection, including a shiftable actuator engaged by said levers and a spring between said disk clutch and said levers.

8. The combination of a driving shaft, a driven shaft, a governor-controlled unit operatively connecting said shafts including a clutch, an actuator for said clutch, a resilient cushion between said actuator and said clutch, levers cooperating with said actuator to control said clutch, speed responsive governor weights distinct from said levers, and an operative connection between said weights and levers for actuating said levers through a limited movement while allowing continued movement of said weights after said weights have acted on said levers to move said actuator to apply said clutch.

9. The combination of a drive shaft, a driven shaft, and a governor controlled unit operatively connecting said shafts including a clutch, speed responsive governor weights acting to engage said clutch, spring means through which a yielding pressure is exerted on said clutch, spring means to resist the movement of said weights to clutch engaging position, an operative connection between said first named spring means and said weights including cam means having a dwell portion for controlling the action of said first named spring means on said weights.

OSCAR H. BANKER.